United States Patent [19]

Hansen et al.

[11] Patent Number: 4,841,932
[45] Date of Patent: Jun. 27, 1989

[54] SPARK TIMING CONTROL

[75] Inventors: Mark C. Hansen; Greg J. Manlove, both of Kokomo, Ind.

[73] Assignee: Delco Electronics Corporation, Kokomo, Ind.

[21] Appl. No.: 221,493

[22] Filed: Jul. 19, 1988

[51] Int. Cl.⁴ ............................ F02P 5/08; F02P 5/04
[52] U.S. Cl. .................................... 123/416; 123/417; 377/20; 73/35
[58] Field of Search ............... 123/416, 417, 406, 643; 73/35, 115; 364/431.04, 431.08; 377/20

[56] References Cited

U.S. PATENT DOCUMENTS

| | | | |
|---|---|---|---|
| 3,738,339 | 6/1973 | Huntzinger et al. | 123/117 R |
| 4,575,865 | 3/1986 | Dackow | 123/416 |
| 4,638,498 | 1/1987 | Siuniger et al. | 123/416 |
| 4,642,772 | 2/1987 | Dackow | 123/416 |
| 4,646,696 | 3/1987 | Dogadko | 123/416 |
| 4,726,347 | 2/1988 | Sasaki et al. | 123/416 |
| 4,741,310 | 5/1988 | Yagi et al. | 123/416 |
| 4,762,106 | 8/1988 | Blaubut | 123/416 |

Primary Examiner—Raymond A. Nelli
Attorney, Agent, or Firm—C. R. Meland

[57] ABSTRACT

A spark timing control for an electronic internal combustion engine ignition system that provides a constant spark advance regardless of engine speed. A series of crankshaft pulses are developed which occur at each 60 degrees of rotation of the crankshaft. The system has a source of constant frequency clock pulses which are counted up by an up-counter during 60 degree periods. The count attained by the up-counter during a 60 degree period is loaded into a down-counter. The up-counter is now counted up at a constant rate from zero and the down-counter is counted down at a constant rate from the count magnitude that was loaded into the down-counter. When the count magnitudes of the two counters are equal, a digital comparator that is connected to the counters develops an output signal that can be used to cause the firing of a spark plug.

5 Claims, 1 Drawing Sheet

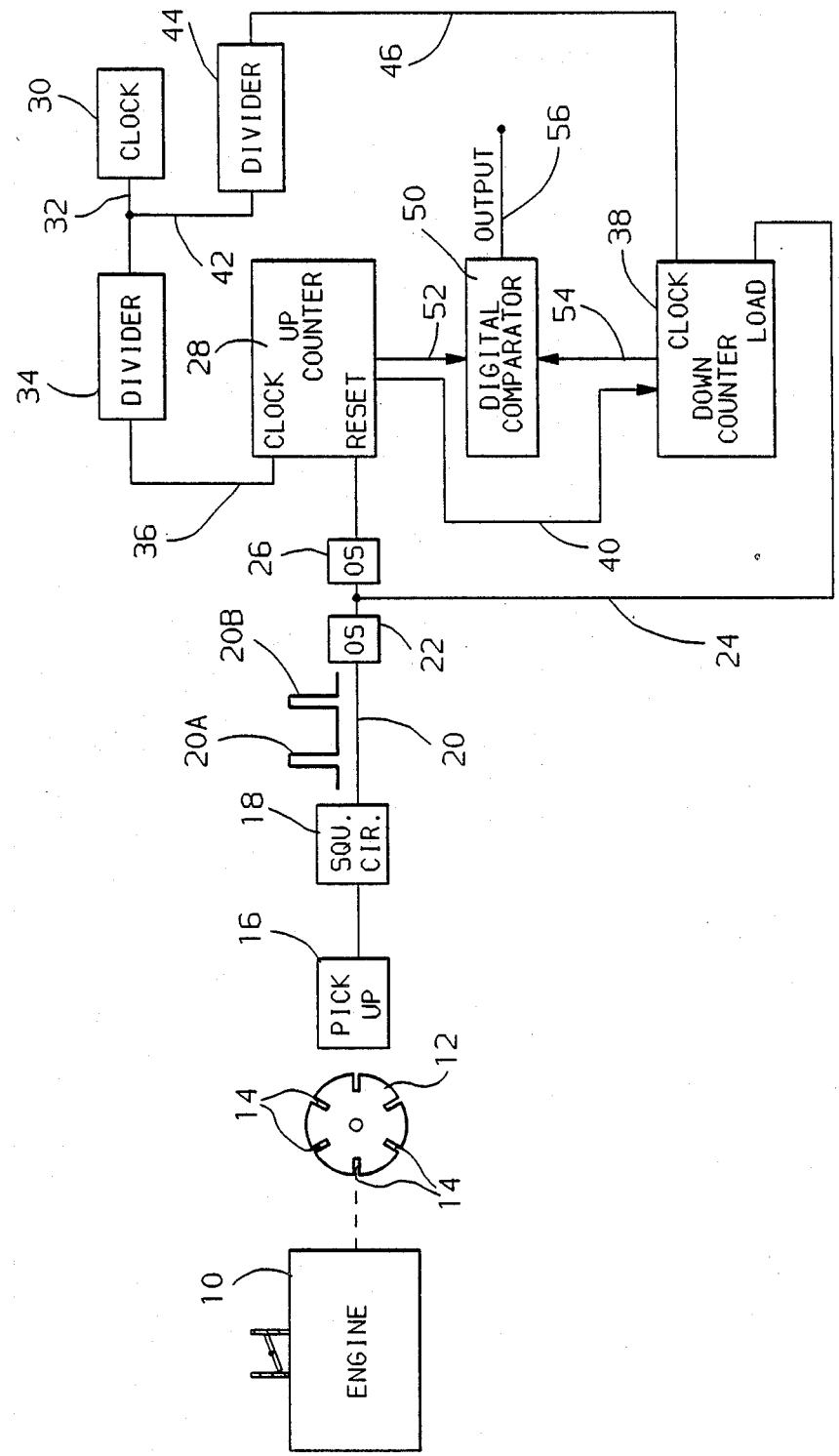

SPARK TIMING CONTROL

This invention relates to an electronic spark timing control for an electronic internal combustion engine ignition system and more particularly to a spark timing control that when in operation maintains spark advance at a constant value regardless of variation in engine speed.

Spark timing control system for internal combustion engine ignition systems are sometimes provided with a bypass control that controls spark timing during starting of the engine and during a failure or malfunction of a programmed microprocessor that otherwise controls spark timing. One example of this is the control system disclosed in the U.S. Pat. No. 4,711,226 to Neuhalfen et al.

When spark timing is controlled by a bypass control, the spark advance is controlled solely as a function of engine speed. Thus, the spark advance control characteristic is such that spark advance is increased linearly with increasing engine speed until engine speed reaches a predetermined engine speed. When engine speed reaches the predetermined engine speed, the spark advance is maintained at a constant value at all engine speeds above the predetermined engine speed.

This invention relates to a system for maintaining spark advance at a constant value at engine speeds above a predetermined engine speed.

It accordingly is an object of this invention to provide a new and improved spark timing control which is effective to maintain spark advance substantially constant at engine speeds above a predetermined engine speed. In the accomplishment of this object, the spark timing control of this invention utilizes an up-counter and a down-counter. Both counters are connected to a digital comparator which compares the count magnitudes of the counters. When the count in the down-counter becomes less than or equal to the count in the up-counter, the comparator develops an output signal which can be used to cause the firing of a spark plug. The system responds to a series of pulses that are developed in synchronism with the rotation of a crankshaft of an engine. A pulse can be developed, for example, at each 60 degrees of rotation of the crankshaft. The up-counter is supplied with constant frequency clock pulses during each 60 degree period between a pair of consecutively occurring crankshaft pulses. The pulses counted by the up-counter during each 60 degree period are loaded into the down-counter. The down-counter is now counted down by constant frequency clock pulses and the up-counter is counted up from zero by constant frequency clock pulses. When the count in the down-counter becomes less than or equal to the count in the up-counter, a spark plug firing control signal is developed by the comparator. The net result of the signal processing that has been described is that spark advance will be maintained at a constant value regardless of engine speed.

IN THE DRAWINGS

The single FIGURE drawing is a schematic circuit diagram of a spark timing advance control made in accordance with this invention.

As described above, bypass spark advance control systems develop a linear variation of spark advance with engine speed and when engine speed exceeds a predetermined value, spark advance is maintained constant. This invention relates only to the development of the constant spark advance with varying engine speed and accordingly the description of this invention is limited to a control system that provides the constant advance. It will be appreciated that the system of this invention would be enabled whenever engine speed exceeds a predetermined engine speed. Below that engine speed the control of this invention would not be used.

Referring now to the drawing, the reference numeral 10 designates a spark-ignited internal combustion engine. The crankshaft of the engine is connected to a disk or wheel 12 which has six slots 14. The slots are equally angularly spaced and the angle between pairs of slots is 60 degrees. The slots cooperate with a pick-up 16 which develops a voltage signal each time a slot 14 passes pick-up 16. The pick-up 16 may be of the magnetic type and may include a pick-up coil. The pick-up 16 is connected to a squaring circuit 18 which develops square wave pulses on line 20. Two consecutive occurring square wave pulses 20A and 20B are shown in the drawing which are produced as disk 12 rotates. These pulses on line 20 are all 60 crankshaft degrees apart and six pulses are developed for every crankshaft revolution.

The line 20 is connected to a synchronous one-shot multivibrator 22. The one-shot 22 is connected to a line 24 and to another synchronous one-shot multivibrator 26. The one-shots 22 and 26 are suitably synchronized to a source of constant frequency clock pulses 30. The one-shot 26 is connected to the reset terminal of an up-counter 28. The clock input of counter 28 is connected to clock 30 by line 32, clock pulse frequency divider 34 and line 36. The clock 30 develops a series of clock pulses having a constant frequency of about 125 KHz. The divider 34 may have a divider factor or ratio of four so that the frequency of the clock pulses on line 36 is 31.25 KHz. The counter 28 operates as a tach-counter and counts up the clock pulses on line 36 between consecutive occurring 60 degree crankshaft pulses. More specifically, counter 28 counts the constant frequency clock pulses on line 36 for each period of 60 degrees of crankshaft rotation. The counter 28 is connected to a down-counter 38 by line 40. The load terminal of down-counter 38 is connected to one-shot 22 by line or conductor 24. When a 60 degree pulse occurs on line 20 a signal is developed on line 24 after a short delay provided by one-shot 22. This signal is applied to the load terminal of down-counter 38 which causes the count in up-counter 28 to be loaded into down-counter 38 via line 40. After another short delay, provided by one-shot 26, the count in up-counter is reset to zero and after this takes place the up-counter starts to count up clock pulses on line 36 from a zero count magnitude. When down-counter 38 is loaded from up-counter 28 the count so loaded into counter 38 replaces or is substituted for the count that was previously in counter 38.

The down-counter 38 has a clock input terminal that is connected to clock 30 by line 32, line 42, clock pulse frequency divider 44 and line 46. The divider 44 divides the output frequency of clock 30 by a factor so that the clock pulses on line 46 have a lower frequency than the frequency of the clock pulses developed by clock 30. The relative frequencies of the clock pulses on lines 36 and 46 and the manner in which this relationship determines spark advance will be described hereinafter.

The control system has a digital comparator 50 connected to counter 28 by line 52 and connected to counter 38 by line 54. The comparator 50 compares the digital count in counter 28 with the digital count in counter 38. When the count in counter 38 becomes less than or equal to the count in counter 28, the comparator 50 develops an output signal on output line 56 which is used to cause the firing of a spark plug in an ignition system (not illustrated).

The operation of the advance control will now be described. The counter 28 and counter 38 cooperate such that the counter 38 contains a count that is a function of the duration of time required for the engine crankshaft to move through 60 degrees. When a 60 degree pulse occurs on line 20, the following events occur. First, the attained up-count of counter 28 is transferred or loaded into down-counter 38. The counter 28 is then reset to zero count and begins to count up the clock pulses on line 36. At this point in time, counter 28 is now beginning to count up from zero and counter 38 is beginning to count down from a count value corresponding to a previous 60 degree period. Putting it another way, each time a 60 degree crankshaft pulse occurs counter 28 starts to count up from a zero count and down-counter 38 starts to count down from a count magnitude that corresponds to a previous 60 degree period of crankshaft rotation.

As counter 28 counts up and counter 38 counts down, the comparator 50 is comparing the counts in the counters. When the count in counter 38 decreases to a magnitude that is equal to or slightly less than the increasing count in counter 28, a signal is developed on line 56 which can be used to cause the firing of a spark plug.

For the purpose of further explaining this invention, let it be assumed that dividers 34 and 44 both divide the input frequency by a factor of four so that counters 28 and 38 are supplied with clock pulses of the same frequency. Let it further be assumed that the number of clock pulses counted by counter 28 during a 60 degree period is equal to T. With these assumptions, a signal will be developed on line 56 by comparator 50 when counter 28 has counted up from zero to a count magnitude of T/2 and counter 38 has counted down from its loaded value of T to a count value of T/2. Thus, when both counters have a count magnitude of T/2 the comparator 50 develops an output signal. The output signal under these assumed conditions would result in a spark advance of 30 crankshaft degrees. This 30 degree spark advance will be maintained constant regardless of engine speed; or putting it another way the spark advance developed by this system is independent of engine speed. Thus, even though the number of clock pulses counted will vary with changes in engine speed, the system is configured such that spark advance is maintained constant.

If the clock rate on line 46 is different from the clock rate on line 36, the amount of spark advance will no longer be 30 degrees. As an example, assume that the divider ratio of frequency divider 34 is four (divide by four) and that the divider ratio of divider 44 is eight (divide by eight). With these assumptions the rate or frequency of the clock pulses on line 46 is one-half of the frequency of the clock pulses on line 36. For every two clock pulses that is up-counted by counter 28, counter 38 will down-count one clock pulse. Given a count T of 60, when counter 28 counts up from zero to 40 clock pulses, counter 38 will have counted down 20 clock pulses from T=60, and both counters will contain 40 clock pulses so the comparator 50 will now develop an output signal. Forty clock pulses is ⅔ of the T period so an advance of 20 degrees of crankshaft rotation is made. The divider ratio of divider 44 is selected to provide a desired constant spark advance that is tailored to a particular engine.

In a preferred embodiment of this invention, the frequency of clock 30 is 125 KHz and the divider 34 has a divider ratio of four so that the frequency of the pulses on line 36 is 31.25 KHz. The divider ratio of divider 44 can be selected to be between four and sixteen in increments of one to produce a fixed spark advance that varies in corresponding steps from 30 degrees to 12 degrees. Putting it another way, thirteen different advance angles can be selected by selecting the divider ratio of divider 44 such that the divider ratio is some whole number between four and sixteen.

Since the clock pulses on lines 36 and 46 come from the same clock 30 and since the advance angle is determined by the ratio of the clock rates or frequency on lines 36 and 46 an error in the clock frequency of clock 30 will not produce any advance error.

The use of a fast clock, that is where clock 30 has a frequency of 125 KHz and where line 36 has a lower frequency of 31.25 KHz, allows an increased number of advance angles to be selected in a given advance angle range. To further explain this, let it be assumed that clock 30 had a clock rate of 31.25 KHz and that divider 34 was not used so that the clock rates on lines 36 and 42 would be 31.25 KHz. Further, assume that the spark advance should be in a range of 30 to 12 degrees. With these assumptions, only four spark advance angles could be obtained within this range, namely, 30 degrees where the divider ratio of divider 44 is one, 20 degrees where the divider ratio of divider 44 is two, 15 degrees where the divider ratio of divider 44 is three and 12 degrees where the divider ratio of divider 44 is four. In contrast, by using a fast clock rate for clock 30 (125 KHz) dividing it down to a lower clock rate (31.25 KHz) by divider 34, thirteen different spark advance angles can be obtained in the range of 30 to 12 degrees by selecting divider ratios for divider 44 that vary in steps of one between four and sixteen.

The embodiments of the invention in which an exclusive property or privilege is claimed are defined as follows:

1. The method of developing a spark timing advance signal for an electronic internal combustion engine ignition system, the steps comprising, developing a series of consecutively occurring crankshaft position pulses that are related to the angular position of the crankshaft of the engine, periodically counting up first constant frequency clock pulses by means of an up-counter for durations of time corresponding to the duration of the time that elapses between consecutive occurring crankshaft position pulses whereby a pulse count magnitude T is periodically attained where T is a function of said duration of time, loading said count magnitude T into a down counter, periodically resetting said up-counter to a zero count magnitude, and then counting up said up-counter from a reset zero count magnitude at the frequency of said first clock pulses and simultaneously down-counting said down-counter from said count magnitude T at the rate of constant frequency second clock pulses, comparing the count magnitude of said counters and developing a signal when the count magnitude of said counters is equal.

2. The method according to claim 1 where the frequency of the second clock pulses is less than the frequency of the first clock pulses.

3. A spark timing control for maintaining a constant spark advance for an internal combustion engine ignition system, the combination comprising, an internal combustion engine, means coupled to the crankshaft of the engine for developing a series of crankshaft position pulses that are related to crankshaft angular position, all of said position pulses being equally spaced by an amount corresponding to a predetermined angle of rotation of said crankshaft, an up-counter, a down-counter, a comparator connected to both counters and operative to develop an output signal when the count magnitude of the two counters is equal, a source of first constant frequency clock pulses, a source of second constant frequency clock pulses, means for causing said up-counter to count up said first clock pulses for durations of time corresponding to the time duration of the time that elapses between consecutive occurring crankshaft position pulses whereby a pulse count magnitude T is periodically attained by said up-counter where T is a function of said time duration, and means responsive to the occurrence of a position pulse for causing said count magnitude T to be loaded into said down-counter, for causing said up-counter to be reset to zero count and subsequently counted up by said first clock pulses and for causing said down-counter to be counted down by said second clock pulses, said comparator developing a signal when the count magnitudes of said counters are equal.

4. The spark timing control according to claim 3 where the frequency of said second clock pulses is less than the frequency of said first clock pulses.

5. The spark timing control according to claim 3 where said first and second source of clock pulses are developed by a source of constant frequency clock pulses that is connected to first and second clock pulse frequency dividers.

* * * * *